United States Patent Office 3,824,243
Patented July 16, 1974

3,824,243
MONO-o-PHTHALYL PIPERAZINE AND MONO-PIPERAZINE MONO-PHTHALATE DI-SALTS
Edward Henderson, deceased, late of New York, N.Y., by Kathryn S. Henderson, executrix, 220 Central Park S., New York, N.Y. 10019
No Drawing. Continuation-in-part of abandoned application Ser. No. 83,602, Oct. 23, 1970. This application Nov. 24, 1972, Ser. No. 309,199
Int. Cl. C07d 51/70
U.S. Cl. 260—268 C       1 Claim

ABSTRACT OF THE DISCLOSURE

Mono-o-phthalyl piperazine,

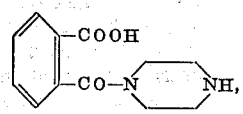

and salts thereof with physiologically acceptable acids, useful as anthelmintics; a method for making mono-phthalyl piperazine by reacting phthalic anhydride and piperazine between 0° C. and 50° C.; mono-piperazine di-salts of o-, m-, and p-phthalic acids, useful as anthelmintics; a method for making said di-salts by reacting a phthalic acid with piperazine between 0° C. and 50° C.

---

The present application is a continuation-in-part of co-pending application Ser. No. 83,602 filed Oct. 23, 1970, now abandoned.

The present invention relates to mono-o-phthalyl piperazine, $C_{12}H_{14}N_2O_3$, to salts thereof with physiologically acceptable acids, to mono-piperazine mono-phthalate di-salts, and to methods of making the same.

Piperazine and certain of its compounds are known in the art as anthelmintics. For example, salts such as piperazine citrate and piperazine adipate are commonly administered orally as anthelmintics.

One disadvantage of these prior art piperazine compounds is their rapid absorption into the bloodstream after ingestion. According to the present invention, it has been found that the novel amide monophthalyl piperazine

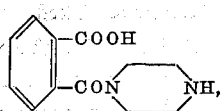

is an effective anthelmintic which is poorly absorbed into the bloodstream. As a result, the compound remains in the intestines for a longer period of time than prior art piperazine compounds, and is more effective against intestinal worm infestation. Because of the low absorption of the compound from the intestine, it is effective against worms in a lower dosage than compounds such as piperazine citrate.

Polymers of piperazine and dicarboxylic acids such as phthalic acid are known in the art, for example from U.S. Pats. 2,913,433 and 2,949,440. However, the preparation and isolation of a monophthalyl piperazine monomer has not heretofore been disclosed.

The monomer is prepared by the reaction of phthalic anhydride and piperazine in approximately equimolar quantities in an inert organic solvent at a temperature between about 0° C. and 50° C., preferably at room temperature, i.e. at 20° C.–25° C. Suitable inert solvents are those which dissolve both the phthalic anhydride and the piperazine reagent, e.g. acetone. The compound is insoluble in these solvents, and precipitates from the reaction solution, thus facilitating separation. The material can be recrystallized from a solvent such as aqueous acetone or water.

Salts of monophthalyl piperazine with physiologically acceptable acids (e.g. salts such as the citrate, adipate, and phosphate) can be prepared by combining equivalent amounts of the base and acid in an inert mutual solvent such as water and recovering their reaction product.

It has now also been found that the di-salts formed between one molecule each of phthalic acid and piperazine are effective anthelmintics which, like the aforementioned half-amide, have low absorption from the intestine. The phthalic acid may be the o-, m-, or p-isomer, and the salts are prepared by the reaction of phthalic acid and piperazine in an inert organic solvent at a temperature between about 0° C. and 50° C., preferably at room temperature, i.e. at 20°–25° C. Suitable inert solvents are those which dissolve both the phthalic acid and the piperazine reagent, e.g. ethanol. The salts are only slightly soluble in these solvents and precipitate from the reaction solution. The salts can be recrystallized from a solvent such as water.

A better understanding of the present invention and of its many advantages will be had by referring to the following specific examples.

EXAMPLE 1

At 25° C., a solution of 14.8 g. (0.1 mole) of phthalic anhydride in 300 ml. of acetone was gradually added with stirring, to a solution of 8.6 g. (0.1 mol) of piperazine in 200 ml. of acetone. A sticky white material separated from the solution. The reaction mixture was kept overnight at room temperature. The supernatant layer was separated. The residue was recrystallized from aqueous acetone to give 12 grams of the product (51 percent of theory).

The product is soluble in water, but only sparingly soluble in ethanol and acetone. The infrared spectrum of the compound studied as a Nujol mull was consistent with the structural assignment. The compound melts at 300° C. with decomposition.

Analysis.—Calculated: C, 61.53; H, 6.02; N, 11.96. Found: C, 61.40; H, 5.82; N, 11.82.

Because of the insolubility of the compound in camphor, its molecular weight could not be determined empirically by the Rast method. Osmotic measurements in water gave a molecular weight of 216+.

By treatment of the compound with diazomethane under mild conditions, the methyl ester was prepared. This more volatile compound was then subjected to mass spectroscopy. The mass spectrum of the derivative gave a series of peaks, none of which was higher than the expected molecular weight of the monomer. The highest peak was M/e=221, possibly arising from the loss of a molecule of HCN from the starting compound. (It is well known that many nitrogen compounds lose HCN in mass spectroscopy.) Explanations can be advanced for other major peaks in the spectrogram.

A nuclear magnetic resonance spectrum of the compound shows that the protons of piperazine and aromatic protons are in the ratio of 2:1, thus eliminating the possibility of either a phthalyl dipiperazine, or a diphthalyl piperazine. The piperazine protons absorb in two regions, and integration under the spectral curve shows the protons to be present in a ratio of 3:1. This finding is consistent with the expectation that the two equatorial protons adjacent the amide nitrogen of the piperazine moiety in the compound are at the lowest field. The two axial protons adjacent the amide nitrogen and the four other protons of the piperazine moiety should appear at a higher field. Thus, the NMR spectrum shows two sets of protons, 2 H at lower field and 6 H at a somewhat higher field. For a dimer or trimer, this pattern would be quite different. Accordingly, on the basis of the NMR data, as well as the mass spectrographic analysis, the compound is a monomer.

EXAMPLE 2

To prepare piperazine o-phthalate,

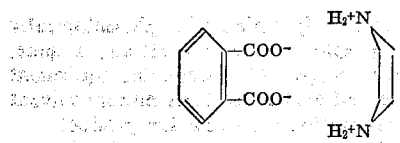

8.31 gms. (0.05 mol) of o-phthalic acid were dissolved in 75 ml. of ethanol at room temperature. A solution of 4.31 gms. (0.05 mol) of anhydrous piperazine in 30 ml. of ethanol was added with stirring. The precipitate formed was settled, filtered and washed with cold ethanol, and then air dried.

The product is pure white (yield 97%) and has an infrared spectrum showing the characteristic conversion of both —COOH groups to —COO⁻ ions, the replacement of the =NH band by the =NH$_2$⁺ band, and a variety of other infrared spectral shifts.

The product is soluble in water, and only minimally soluble in warm acetone and alcohols. M.W.=252.27; m.p.=194° C. (decomp.).

EXAMPLE 3

To prepare piperazine m-phthalate

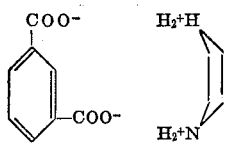

8.31 gms. (0.05 mol) of isophthalic acid were dissolved in 75 ml. of ethanol at room temperature. A solution of 4.31 gms. (0.05 mol) of anhydrous piperazine in 30 ml. of ethanol was added with stirring. The precipitate was settled, filtered and washed with cold methanol, and then air dried.

The product is a pure white powder (yield 97%) and has an infrared spectrum representing the characteristic conversion of both of the —COOH groups to —COO⁻ ions, the replacement of the =NH band by the =NH$_2$⁺ band, and a variety of other infrared spectral shifts.

The product is water soluble, but virtually insoluble in warm acetone and alcohols. M.W.=252.27; m.p.=265° C.

EXAMPLE 4

To prepare piperazine p-phthalate

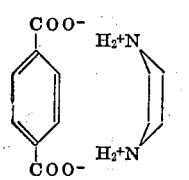

8.31 gms. (0.05 mol) of terephthalic acid were dissolved in 200 ml. of dimethylformamide-ethanol (2:1). 4.31 gms. (0.05 mol) of anhydrous piperazine dissolved in 30 ml. of ethanol were added with stirring. The precipitate was allowed to settle, filtered and washed with cold DMF-ethanol (1:1) and then with pure ethanol, and air dried.

The product is pure white (yield 98%) and has an infrared spectrum showing the characteristic conversion of both —COOH groups to —COO⁻ ions, the replacement of the =NH band by the =NH$_2$⁺ band, and a variety of other infrared spectral shifts.

The product is soluble in water, and only minimally soluble in warm acetone, alcohols, and DMF. M.W.= 252.27; m.p.=350° C. (decomp.).

The stools of a group of white mice, average weight 25 grams, were studied for the presence of *Syphacia obvelata*. All mice were positive. Piperazine terephthalate was administered to five mice in a single daily dose of 5 mg. per mouse and to a group of five mice in a single daily dose of 10 mg. per mouse. The medication was repeated daily for five days. Stools of the mice were examined daily during the treatment period. The stools of all treated mice were examined two days after cessation of medication and one week and two weeks after cessation of medication. The daily stool examinations were made using Faust's zinc sulfate concentration method. All mice treated with both dosage forms were free of infestation after the third day and remained negative during all observations following medication. All controls remained positive.

|  | Day | | | | | Post treatment | | | |
|---|---|---|---|---|---|---|---|---|---|
|  |  |  |  |  |  | Day | | | |
| Drug | 1 | 2 | 3 | 4 | 5 | 6 | 7 | 1 week | 2 weeks |
| P. terephthalate | + | + | + | − | − | − | − | − | − |

Piperazine orthophthalate and piperazine isophthalate gave comparable results.

Piperazine and its salts are commonly used in veterinary medicine at a dosage rate of 100 mg./lb. of body weight in large animals and 50 mg./lb. of body weight, calculated as the base. The compounds of the invention can be used at the same or lower dosage rates.

In a test of toxicity of the compound, monophthalyl piperazine was administreed to albino mice at a dosage rate of 10 g. per kilo of body weight. All of the mice survived.

What is claimed is:

1. Mono-o-phthalyl piperazine half-amide and salts thereof with physiologically acceptable acids.

References Cited

UNITED STATES PATENTS

| 2,799,617 | 7/1957 | Forrest et al. | 260—268 R |
| 2,819,268 | 1/1958 | Baisse | 260—268 C |
| 2,913,433 | 11/1959 | Wittbecker | 260—268 C |
| 2,949,440 | 8/1960 | Katz | 260—268 PC |
| 3,025,300 | 3/1962 | Huebner | 260—293.76 |

DONALD G. DAUS, Primary Examiner

U.S. Cl. X.R.

260—268 R, 268 PC; 424—250